Figure 1:
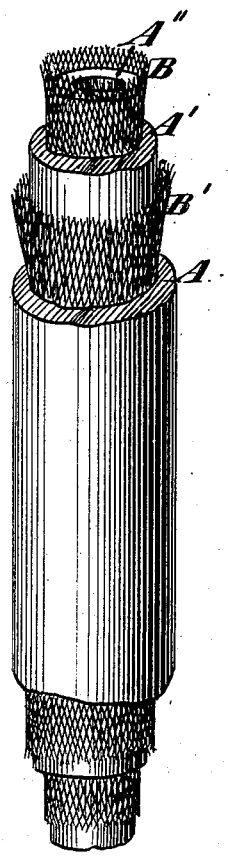

R. P. BEATTY & J. H. HAULENBEEK.
Hose.

No. 209,953.  Patented Nov. 19, 1878.

UNITED STATES PATENT OFFICE.

ROBERT P. BEATTY AND JOHN H. HAULENBEEK, OF NORWALK, CONN.

IMPROVEMENT IN HOSE.

Specification forming part of Letters Patent No. 209,953, dated November 19, 1878; application filed March 20, 1878.

*To all whom it may concern:*

Be it known that we, ROBERT P. BEATTY and JOHN H. HAULENBEEK, both of Norwalk, in the county of Fairfield and State of Connecticut, have invented an Improvement in Hose; and we hereby declare that the following is a full, clear, and exact description of the same, reference being had to the accompanying drawing, forming a part of this specification.

Our invention relates to that class of hose known as "rubber hose," which hose is made partly of vulcanized rubber and partly of some sort of textile material interposed between the layers of rubber. Such hose has been hitherto made of strips of rubber wound on a mandrel and strips of canvas or other textile material wound on the interior layers of rubber and covered by a final layer of rubber, the whole being then vulcanized.

Another method of making such hose has been to wind spirally upon a mandrel sheets or strips of cloth covered with a vulcanizable compound of india-rubber, the whole being vulcanized after the winding.

In still another method of making such hose it has been formed as follows: A layer or ply of soft unvulcanized rubber has been put on a mandrel, and longitudinal binders of thread, wire, twine, &c., have been placed on the outer surface of the said ply, parallel to its longitudinal axis; then another ply of hose has been placed over the said binders, and, the said plies of the hose being rolled together, the whole has been vulcanized to complete the same. The said longitudinal binders were employed to prevent any longitudinal stretch of the hose when subjected to internal hydrostatic pressure, which longitudinal stretching was supposed to greatly weaken the hose as previously constructed. With these longitudinal binders were combined, in some cases, other binders, wound, twisted, or braided around the said plies of hose and the first-named binders in such manner as to further assist in preventing any longitudinal stretching of the hose when completed and subjected to internal liquid pressure, as hereinbefore stated.

Now, the fact is, that, with any ordinary construction of hose without the longitudinal binders hereinbefore described, the strain in the circumferential direction is so much greater than that in the direction of the length of the hose that such hose almost uniformly ruptures by opening longitudinally instead of breaking crosswise, or, as it is ordinarily said, "it splits;" and if the endwise stretching can be made to oppose its strain to the circumferential strain, the hose will be thereby that much strengthened in the only direction in which it is liable to rupture under internal liquid-pressure.

It is the object of this our invention to so construct a hose that the endwise stress shall be made to oppose its force to the circumferential stress, or that stress which tends to split the hose when the said hose is subjected to internal pressure in the use of the same.

To this end our invention consists in a hose formed of rubber, having embedded in the same one or more seamless braided webs of interlaced filamentous material, so arranged and incorporated with the elastic substance of the rubber that the longitudinal stress caused by the longitudinal pressure in the said hose shall be converted into stress in the said braided web opposed to the outward circumferential stress caused by the pressure of the liquid in the said hose.

The invention will be sufficiently illustrated by a description of the same as applied to a three-ply hose.

Figure 2:
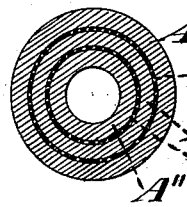

Figure 1 in the drawing represents a portion of such a hose constructed in accordance with our invention. Fig. 2 is a cross-section of the same.

In carrying out our invention, we take a suitable mandrel, and form thereon a tube, A'', or layer or ply of soft, unvulcanized rubber. We then braid thereon a seamless web, B, of wire, thread, twine, or other filamentous material, and in the said braiding draw the said threads, wires, twines, or filaments of the said web so tightly that they embed themselves in the said tube of soft, unvulcanized rubber. We also braid the said web in such manner that the filaments thereof interlace and lie obliquely both to the longitudinal axis of the hose and to a circle drawn at right angles with the said axis. Then we form on the outside of the first tube, A'', a second ply, A', of soft, unvulcanized rubber, and compact the two plies together till they unite into a homogeneous mass between and through the interstices or meshes of the said braided seamless web. Next, upon the outside of the said second layer or ply, A', of soft, unvulcanized rubber we braid another seamless web of the filamentous material, drawing the filaments of the same so tightly as to embed the same in the soft rubber, as before described. Over the said seamless braided web B' we place another layer or ply, A, of soft, unvulcanized rubber, and so firmly compress the same on the layer or ply A' that the said layer or ply A joins itself to and becomes continuous with the layer or ply A'.

It must be understood that the said webs B and B' are so constructed that each of their filaments pass around the layers of rubber inclosed by the said webs in a spiral direction, one portion or one half of the said filaments passing around the said layers in one direction, while the other portion or half passes around the said layers in the opposite direction. The effect of this construction is that the sides of the interstices or meshes of the said seamless web or fabric lie parallel neither to the central longitudinal axis of the hose nor to a circle drawn at right angles to the said axis. Therefore the longitudinal stress upon the hose caused by liquid-pressure therein is exerted in diagonal lines with reference to the said meshes, and the result is that the stretching of the said webs longitudinally causes their contraction circumferentially. This opposes the force of the longitudinal stress of the webs to the force of the outward circumferential stress upon the rubber, and thereby strengthens or reenforces the rubber part of the said hose in the direction in which it is most liable to rupture as ordinarily constructed.

The vulcanizing of the hose completes the manufacture of the same, the said process of vulcanizing being so well known to persons skilled in the art of rubber manufacturing that it is unnecessary to describe the same in our specification.

By this means we are enabled to produce a hose that, by actual tests, withstands a much greater strain than any hose we have been able to find in the market.

We claim—

A hose composed of two or more layers of rubber, having one or more seamless braided webs of interlaced filamentous material interposed between and embedded in the said layers, the said web or webs having its or their interlaced filaments arranged in lines oblique to both the longitudinal axis of the hose and to a circle drawn at right angles to the said axis, the obliquity of one portion of the filaments in each web being in a direction opposite to that of the remaining portion, substantially as and for the purpose set forth.

ROBT. P. BEATTY.
JOHN H. HAULENBEEK.

Witnesses:
ALFRED H. CAMP,
T. H. DIXSON.